United States Patent
Gao et al.

(10) Patent No.: US 7,245,715 B2
(45) Date of Patent: *Jul. 17, 2007

(54) INTEGRATED CHAT CLIENT WITH RECEIVING PARTY CHOICE

(75) Inventors: Xiaofeng Gao, Alpharetta, GA (US); David Scott, Norcross, GA (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/222,063

(22) Filed: Sep. 8, 2005

(65) Prior Publication Data

US 2006/0034444 A1    Feb. 16, 2006

Related U.S. Application Data

(63) Continuation of application No. 10/159,377, filed on May 30, 2002, now Pat. No. 6,975,719.

(51) Int. Cl.
*H04M 3/00* (2006.01)

(52) U.S. Cl. .................. 379/265.09; 379/900

(58) Field of Classification Search ............ 379/93.21, 379/93.24, 158, 202.01, 219, 221.08, 221.09, 379/265.09, 900; 370/260, 261, 270; 709/204
See application file for complete search history.

(56) References Cited

U.S. PATENT DOCUMENTS

| | | |
|---|---|---|
| 5,483,588 A | 1/1996 | Eaton et al. |
| 5,572,582 A | 11/1996 | Riddle |
| 5,805,587 A | 9/1998 | Norris et al. |
| 5,809,128 A | 9/1998 | McMullin |
| 6,078,581 A | 6/2000 | Shtivelman et al. |
| 6,141,413 A | 10/2000 | Waldner et al. |
| 6,272,214 B1 | 8/2001 | Jonsson |
| 6,275,575 B1 | 8/2001 | Wu |
| 6,320,857 B1 | 11/2001 | Tonnby et al. |
| 6,345,047 B1 | 2/2002 | Regnier |
| 6,366,840 B1 | 4/2002 | Buckley |
| 6,463,131 B1 | 10/2002 | French-St. George et al. |
| 6,603,840 B2 | 8/2003 | Fellingham et al. |
| 6,661,785 B1 | 12/2003 | Zhang et al. |
| 6,677,976 B2 | 1/2004 | Parker et al. |
| 6,724,871 B2 | 4/2004 | Maytal |
| 6,757,732 B1 | 6/2004 | Sollee et al. |

(Continued)

OTHER PUBLICATIONS

U.S. Appl. No. 10/159,314, Entitled: Integrated Chat Client with Calling Party Choice.

(Continued)

*Primary Examiner*—Bing Q. Bui
(74) *Attorney, Agent, or Firm*—Thomas, Kayden, Horstemeyer & Risley, LLP

(57) ABSTRACT

Phone systems for an integrated chat client service are provided. A representative phone system includes a call processing system operable to check a chat server for accessibility of a calling party chat client associated with a calling party and coupled to the internet, the call processing system being further operable to prompt a called party to select to talk or chat. Methods to connect telephone calls and answer telephone calls are also provided.

20 Claims, 5 Drawing Sheets

U.S. PATENT DOCUMENTS

2003/0006194 A1    1/2003    Williams et al.
2003/0026402 A1    2/2003    Clapper
2003/0043787 A1    3/2003    Emerson, III
2003/0112930 A1    6/2003    Bosik et al.
2003/0112931 A1    6/2003    Brown et al.
2003/0185360 A1    10/2003   Moore et al.
2004/0086100 A1    5/2004    Moore et al.

OTHER PUBLICATIONS

U.S. Appl. No. 10/159,306, Entitled: DSL Integrated Call Waiting. "Instant Messaging" notation made on Information Disclosure Statement submitted in conjunction with this document.

INTEGRATED CHAT CLIENT WITH RECEIVING PARTY CHOICE

CROSS-REFERENCE TO RELATED APPLICATION

This application is a continuation of U.S. utility application entitled, "Integrated Chat Client with Called Party Choice," having Ser. No. 10/159,377, filed May 30, 2002, now U.S. Pat. No. 6,975,719 which is entirely incorporated herein by reference.

TECHNICAL FIELD

The present invention is generally related to telecommunications and more particularly to the integration of telephone systems and internet applications.

DESCRIPTION OF THE RELATED ART

The telecommunications industry has undergone rapid changes in the past several years. With the development of the advanced intelligent network (AIN), telephone companies are poised to offer a multitude of new services to subscribers. Typically, AINs provide a more flexible handling of telephone calls. This flexibility is provided by a complex packet-switched network which allows for high speed communication and high volume traffic. One example of an AIN is further described in U.S. Pat. No. 5,701,301 and U.S. Pat. No. 5,838,774, each of which is hereby incorporated by reference.

AIN embodiments in the United States use a signaling system 7 (SS7) protocol to transport messages. Instead of circuit switching, the AIN relies on soft switching to provide high speed routing for telephone calls. The AIN comprises service switching points (SSPs), service nodes (SNs), signal transfer points (STPs), and service control points (SCPs). An SSP is typically an AIN-compatible switching office. The SN is a smart termination device that assesses incoming call information and make appropriate connections. The SSPs are connected by a number of STPs which transfer data among the SSPs and between the SSPs and SCPs. The STPs can generally be described as the routers which read the packet and transfer it to the called party SSP. Finally, the SCP is typically a fault tolerant computer that is coupled to a central database. This central database comprises a host of subscriber and routing information.

For better understanding a call routing sequence on an SS7 network will now be described. Typically, when a call is placed a calling party dials a telephone number and an SSP receives the place call request and routes it to the proper SSP associated with the called party. When the called party SSP receives the call request, it causes a trigger to fire. This trigger then causes the SSP to send a query across the STPs to an SCP. The query typically comprises asking the SCP how the call should be handled, such as specific subscriber instructions and any other specific routing information that is necessary. After receiving handling information from the SCP, the SSP uses these instructions to create a packet to send across the STPs to the called party SSP. The called party SSP then triggers and asks the SCP for subscriber-specific handling information for the called party. Typically the SCP will merely instruct the SSP to connect the call, however, the called party may have special instructions for incoming calls.

As was noted above, the AIN allows for subscriber-specific handling instructions. However, there presently is no mechanism by which a called party can keep his/her side of the conversation private from others who may be present in the room. Therefore, there is a need for systems and methods that address these and/or other perceived shortcomings of the prior art.

SUMMARY

One embodiment, among others, of the present disclosure provides systems and methods for an integrated chat client having a receiving party choice. A representative system includes a communication system having a first processing system element operable to check a chat server for accessibility of a sending party chat client associated with a sending party; and a second processing system element operable to prompt a receiving party to select to talk or chat.

An example method to connect communications includes: checking for accessibility of a sending party chat client associated with a sending party; and prompting a receiving party to choose to either talk or chat if the receiving party chat client is accessible.

Other systems, methods, features, and advantages of the present disclosure will be or become apparent to one with skill in the art upon examination of the following drawings and detailed description. It is intended that all such additional systems, methods, features, and advantages included within this description and be within the scope of the present disclosure.

BRIEF DESCRIPTION OF THE DRAWINGS

The invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION

The invention now will be described more fully with reference to the accompanying drawings. The invention may, however, be embodied in many different forms and should not be construed as limited to the embodiments set forth herein; rather, these embodiments are intended to convey the scope of the invention to those skilled in the art. Furthermore, all "examples" given herein are intended to be non-limiting.

Figure 1:
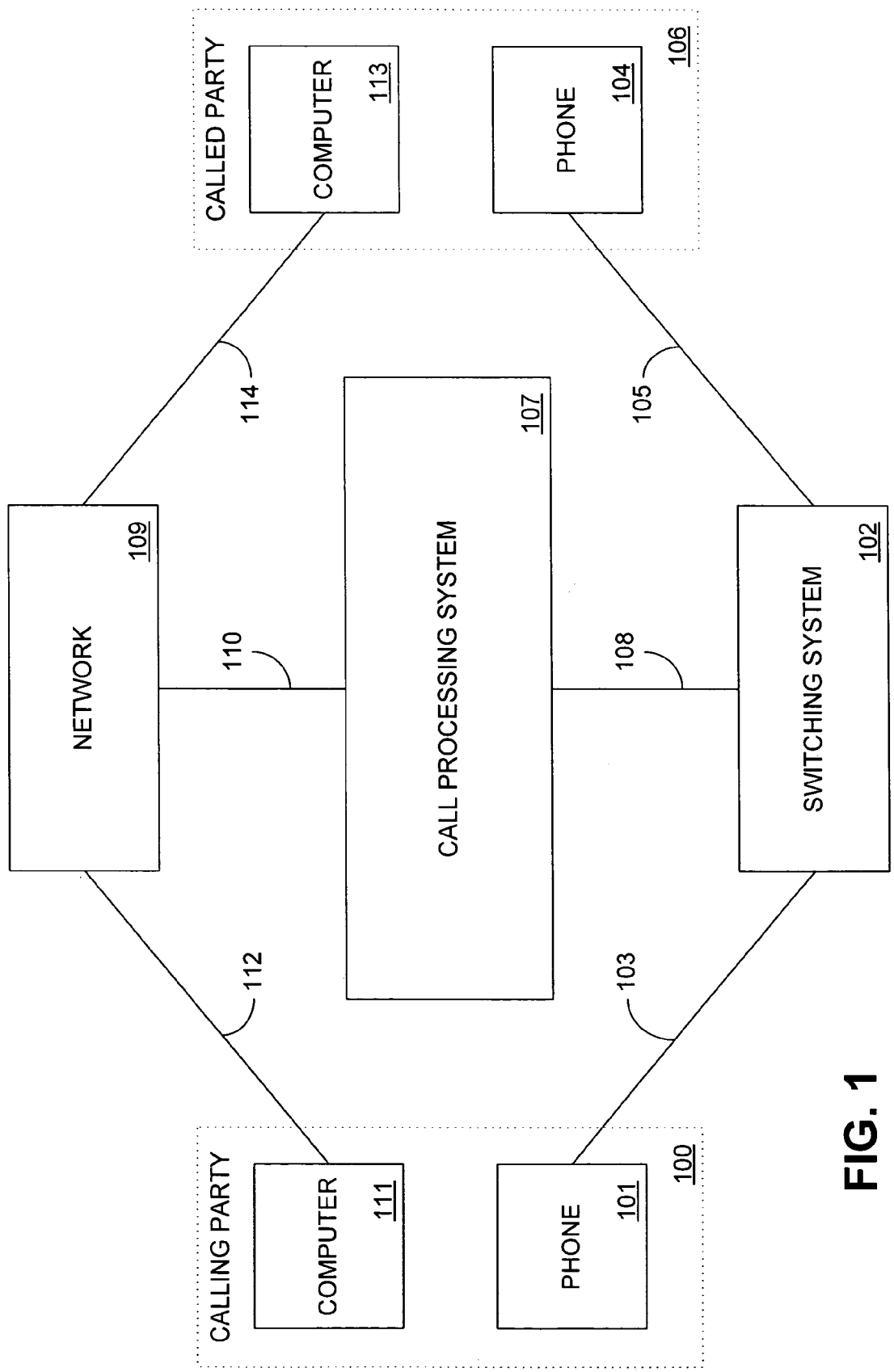
FIG. 1 is a block diagram illustrating a first embodiment, among others, of the present invention.

Referring now to FIG. 1, shown is a block diagram of one embodiment, among others, of the present invention. In this embodiment a calling party location 100 preferably includes a standard plain-old telephone system (POTS) phone 101 operating substantially within the POTS frequency range. The POTS frequency range is typically defined as the frequency range of 0 to 4 kilohertz (kHz), which contains substantially the range of frequencies which are audible to the human ear. The phone 101 is typically connected to a switching system 102 by a connection 103. The switching system 102 routes calls placed by a calling party to a called party telephone 104, which is connected to the switching system 102 through a connection 105. The called party telephone 104 is preferably a standard POTS telephone and resides at a called party location 106. The switching system 102 generally includes a network of switches which are connected to a call processing system 107 through a connection 108. During operation the switching system 102 receives call routing information which is stored on the call processing system 107. Further, the call processing system 107 can store any subscriber-specific information on call handling. In other words, for example, if the called party has subscribed to caller-identification (caller-ID), the call processing system 107 instructs the switching system 102 to include a caller-ID information packet with a call attempt indication (ring) sent to the caller on line 105. The indication typically includes an aural prompt such as ringing, however, it can include other sensory prompts, such as vibration, etc.

Another service that can be provided to the called party is an integrated chat client service, called party choice, which is embodied by the present invention. Generally, the switch associated with the called party will trigger a query to the call processing system 107 when an incoming call is received. When the called party has subscribed to the integrated chat client service, the call processing system 107 contacts a network 109 through link 110 to search network computer accessibility. Specifically, the call processing system 107 searches for the accessibility of a calling party computer 111 connected to the network 109 by link 112.

If a calling party computer 111 is not accessible, the call processing system 107 instructs the switching system 102 to attempt to connect the call by ringing the called party telephone 104. However, if a calling party computer 111 is accessible, after the call processing system 107 instructs the switching system 102 to ring the called party telephone 104, the called party telephone 104 rings, and the called party telephone is answered, the call processing system 107 sends a prompt, such as a recorded voice message from an interactive voice recording (IVR) system to the called party telephone 104. The prompt notifies the called party through the called party telephone 104 that the calling party computer 111 is accessible and prompts the called party to choose to chat with the calling party or talk with the calling party.

If the called party chooses to talk, a voice connection is made between calling party telephone 101 and called party telephone 104 by the switching system 102 using instructions from the call processing system 107. However, if the called party chooses to chat, the call processing system 107 retrieves network addresses of called party computer 113 and calling party computer 111. The call processing system 107 then sends a chat invitation to the network addresses corresponding to the calling party computer 111 and called party computer 113 through a connection 114. The voice call may then be terminated, or alternatively, the call processing system 107 may send the calling party telephone 101 notification of the called party's election to chat rather than talk.

In alternative embodiments, the call processing system 107 may search for accessibility of calling party computer 111 and called party computer 113. However, one skilled in the art will recognize that the called party is already aware of whether the called party computer 113 is accessible, and may choose to chat or not to chat, accordingly. Moreover, the called party might make the called party computer 113 accessible to chat with the calling party computer 111 upon learning that the calling party computer 111 is accessible.

One skilled in the art will immediately recognize an abundance of chat clients presently available that may be used in conjunction with the present invention. Some of the more popular of these chat clients include: MSN Messenger, available from Microsoft, Corp. of Redmond, Wash.; Yahoo! Messenger, available from Yahoo!, Inc. of Sunnyvale, Calif.; AOL Instant Messenger, available from America Online, Inc. of Dulles, Va.; and Jabber Instant Messenger, available from Jabber, Inc. of Denver, Colo. One skilled in the art will further recognize that the Jabber Instant Messenger comprises an open systems architecture. Open systems architectures generally allow a user to manipulate the source program to tailor the client to specific needs of each individual user. Used in this context, the open system architecture could facilitate the development of a custom application to be provided with the integrated chat client. One skilled in the art will further recognize the existence of UNIX and LINUX chat programs and other programs, such as text messaging on wireless phones, that allow text communication between two parties. In alternative embodiments, each of these alternative text communication applications are intended to be included within the scope of the present invention. Generally, as understood herein, chat clients at least provide some type of text-based communication, in accordance with the preferred embodiment of the invention.

It should be further recognized that, presently, there is no interoperability of chat services. Each uses a different server and a different database to connect the plurality of users that use a particular chat client. It can be compared to a situation whereby customers of one phone company would be prevented from calling customers of another phone company. This could pose a problem, generally referred to as the network effect, to widespread acceptance of the integrated chat client service. The network effect generally refers to the situation whereby a service becomes more valuable to a consumer when more consumers subscribe to the same service, thereby forming a network.

The most straightforward solution to the network effect is to create interoperability between the numerous different chat services that exist. There is a push within the internet community to create a universal chat program and sharing of client databases, along with several proposals to create interoperability among chat clients, however, there remains no industry consensus. As is often the case, it is difficult to get competing entities to share customer information that may help competing service providers.

Another solution to the problem could be for the telephone service provider to provide a custom application to all of its subscribers. In this way, the telephone service provider can create an instant network of users. However, the telephone service provider would still have to compete with the other chat service providers. Moreover, a calling party could be inaccessible to the telephone service provider network, even though it may have an accessible chat client installed. The advantage to this solution is that the telephone service provider will have direct access to the chat server, which would likely be faster than requesting the chat information from a third party.

Yet another solution to the network effect could be to form alliances between the telephone service provider and chat service providers. This solution is similar to the interoperability solution, however, it involves agreement between the telephone service provider and the chat service provider. For this solution, the telephone service provider could merely have access to query the chat server and request chat invitations be sent to accessible party chat clients.

A further alternative embodiment, among others, of the present invention includes checking a network database to ascertain the accessibility of the calling party computer 111 or the called party computer 113. This database could include a number of different fields regarding customizable options. One such field could comprise a list of customers that have a chat client registered with the database on the network. This field would be similar to the so-called "buddy list" commonly used on many instant messaging clients. When a user opened a chat client and entered his/her user identification (handle) and password, the chat client would automatically record that handle as present with the accessibility database.

Another useful field could be an availability field. The availability field could be a field similar to a sleep mode on a computer. When a user has not accessed the chat client for a predetermined amount of time, or has told the chat client that he/she will be away from the computer, the chat client will still show the chat client as present, however, the chat client will be listed as unavailable, and hence inaccessible.

The network could also keep track of a preference field. These preferences could be set by the users regarding their instant messaging clients. For example, one user might prefer to get invitations to chat, while another may not want to be bothered with chat invitations at the present time. These chat clients which prefer not to be bothered with chat invitations would be listed as inaccessible. Furthermore, the called party may not want to receive an IVR every time an incoming call is received from a calling party with an accessible computer. In this case, the called party can set his/her accessibility database to show their chat client is inaccessible, and the call processing system 107 considers the called party accessibility during operation.

Figure 2B:
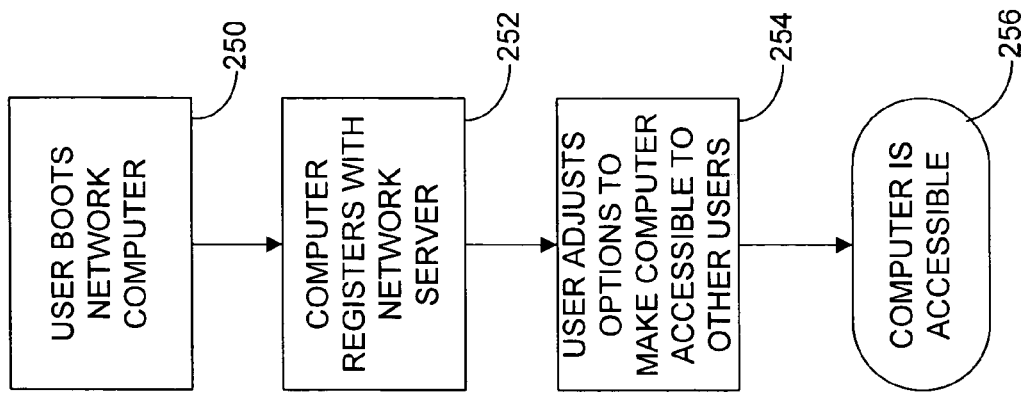
FIG. 2B is a flowchart showing the operation by which a computer is made accessible with respect to FIG. 2A.
Figure 2A:
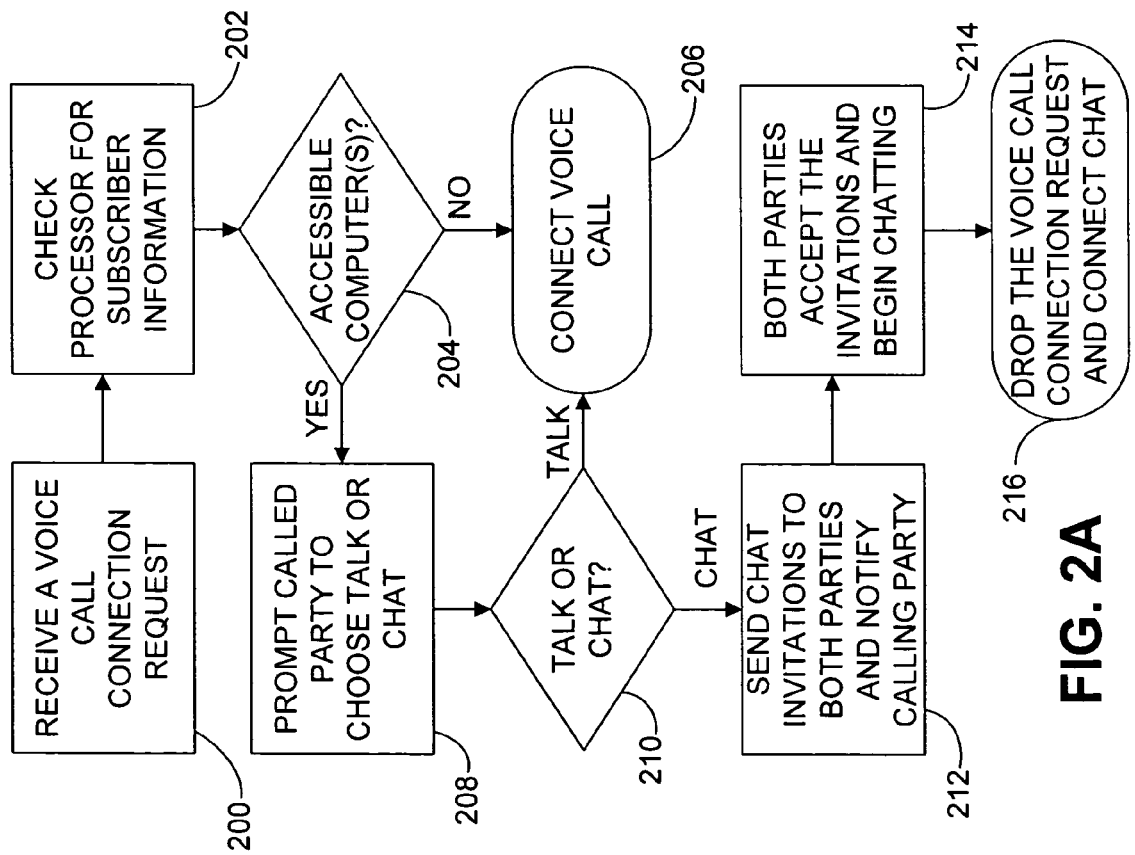
FIG. 2A is a flowchart showing the operation of the first embodiment of the present invention, among others.

Referring now to FIG. 2A, shown is a flowchart illustrating the operation of one embodiment, among others, of the present invention. In block 200 a voice call connection request is received at a switch. This voice call connection request triggers a query to the call processing system 107, illustrated by block 202, to check for subscriber-specific handling information. Though not shown, if a subscriber does not subscribe to an integrated chat service, the call is processed conventionally, and the process of FIG. 2A terminates. If a subscriber subscribes to the integrated chat client service, in block 204 the call processing system 107 checks for an accessible computer 111 associated with the calling party. If there is no accessible associated computer 111, in block 206 the call processing system 107 instructs the switch to connect the voice call. However, if there is a computer associated with the calling party that is accessible, in block 208 the call processing system 107 then instructs that a prompt be sent to the called party telephone 104. In block 210, the called party is then prompted. In one embodiment, among others, the prompt can be an interactive voice response (IVR) prompt that asks the called party if he or she would like to chat instead of talk. If the called party chooses not to chat (i.e. to talk) the voice call is connected, as illustrated by block 206. However, if the called party chooses to chat, in block 212 the call processing system 107 instructs that chat invitations be sent to the calling party computer 111 and to the called party computer 113. When both parties accept the chat invitations, they may begin chatting, as illustrated by block 214. Finally, in block 216, the voice call connections request is dropped, and the parties are allowed to continue chatting over the network.

One skilled in the art will note that, with respect to block 204, and as discussed with reference to FIG. 1, the call processing system 107 may further check whether a network computer 113 associated with the called party is accessible. This feature is particularly useful when the network 109 allows users to specify options which can make the computer 113 inaccessible, even though it is on the network 109. Thus, a called party will not be bothered with an IVR prompt after the called party has already stated his/her own preferences through the network connection.

Referring now to FIG. 2B, shown is a flowchart illustrating a method by which a computer (either the calling party computer 111 or called party computer 113) is made accessible to the integrated chat client service. In general, it would be preferable if all computers operated according to the method of FIG. 2B, however, the method could work even if only a handful of network computers operated according to the method of FIG. 2B. As shown in block 250, the user first boots the network computer. Then in block 252, the network computer registers with a network server. Typically a computer registers with the network either during the startup process, or when the user decides to use the internet. Then, as shown in block 254, the user can adjust a number of options to make the computer accessible to other users for chat session invitations.

Some of these options can be automated, while others may require user input to change. A few such options, among a plurality of others, could be: presence, wherein the computer is either registered or not registered with the server; preference, wherein the user has requested not to be available for chat sessions; and availability, wherein the user has left his/her chat client inactive for a period of time, or has indicated to the network computer that he/she will be unavailable. One skilled in the art will recognize numerous other accessibility options that can be configured to provide a user with enough flexibility for almost any situation.

Figure 3:
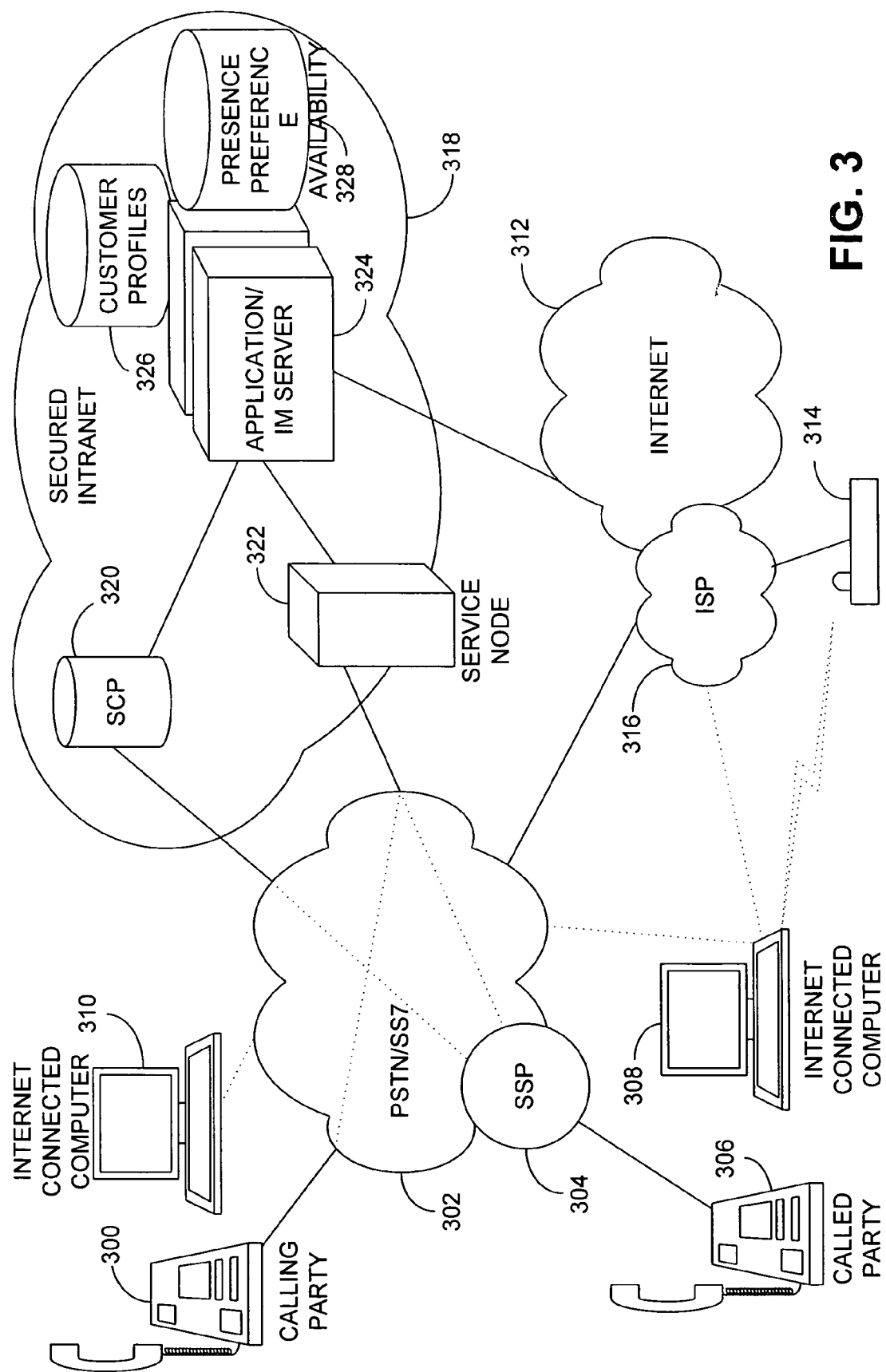
FIG. 3 is a schematic diagram illustrating one embodiment, among others, of the present invention.

Referring now to FIG. 3, shown is a schematic diagram of one example a system, among others, made according to FIG. 1. As is shown, a calling party telephone 300 is connected to a PSTN/SS7 protocol network 302. The SS7 protocol network includes a plurality of service switching points 304, which in turn are connected to a plurality of telephones, including the called party telephone 306. The called and calling parties have associated computers 308, 310, respectively. Each of these computers can be connected to the internet 312. As is known to those skilled in the art, internet connections can come in a variety of different forms. A few such forms include: a wireless local area network connection 314, through an internet service provider (ISP) 316; a direct connection to the ISP 316; a dial-up modem through the PSTN 302; a digital subscriber line through the PSTN 302; and a cable modem (not shown). Although the calling party computer 310 is shown connected to the internet 312 through the PSTN 302, the calling party computer 310 may be connected with any of the methods enumerated above, or any other method for connecting to the internet 312.

The PSTN/SS7 protocol network is further connected to a secured intranet 318, controlled by the telephone service provider, for example. The secured intranet 318 includes a service control point 320, a service node 322, both of which are coupled to an application server 324, containing a customer profile database 326 and a presence, preference and availability database 328.

One skilled in the art will recognize that each telephone service provider has a slightly different implementation of the AIN system, and often component names differ some between these implementations. Each of these alternative implementations of the AIN system is intended to be included within the scope of the present invention. Furthermore, the fact that the AIN and SS7 protocol are used in exemplary embodiments of the present invention is not intended to limit the present invention to these particular implementations of intelligent networks (INs). Any IN or phone network with the ability to deliver customized phone service has the potential ability to advantageously utilize the present invention.

Figure 4:
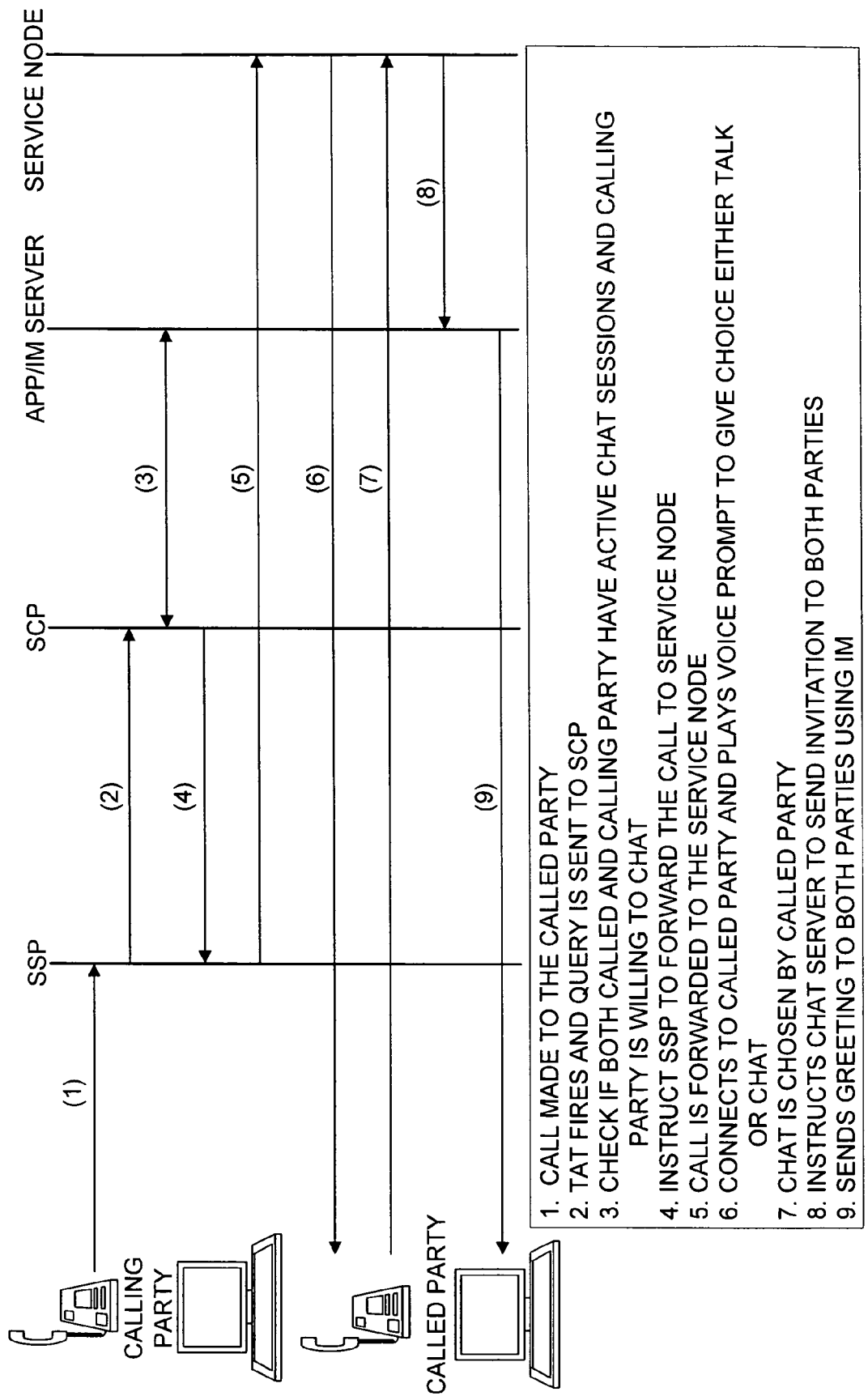
FIG. 4 is a call flow diagram detailing the operation of the embodiment shown in FIG. 2.

Referring now to FIG. 4, shown is a call flow diagram illustrating the operation of one embodiment of the invention, as shown in FIG. 3. As one skilled in the art will recognize the system involves making the calling and called party computers 300, 306 accessible to chat prior to placing a telephone call. First a calling party places a call to the called party.

When the call is received at the called party SSP 304, a termination attempt trigger fires. The termination attempt trigger then causes the SSP 304 to send a query to the SCP 320. The SCP 320 generally contains a database of subscriber-specific profiles and call routing information. When the SCP 320 receives the query from the SSP 304, the SCP 320 searches the database for a subscriber-specific profile. The subscriber-specific profile, for this example, includes the integrated chat client service.

In this embodiment, the SCP 320 then instructs an application/chat server 324 to search its database 328 to check if the called and calling parties have active chat sessions and to see if the calling party chat session is set up to accept chat invitations. If both parties have active chat session and are accepting chat invitations, the SCP 320 instructs the SSP 304 to forward the call request to the service node.

The SSP 304 then forwards the call to the service node 322, which rings the called party telephone 306 and uses an IVR to prompt the called party with an option to chat or to talk with the calling party. One skilled in the art will recognize that the service node 322 may further include caller identification information to facilitate the choice of whether to chat or to talk. When the called party does not wish to chat, a voice call is connected. However, when the called party chooses to chat, the service node 322 then instructs the application/chat server 324 to send a chat invitation to each of the parties. The application/chat server then sends greetings to the called and calling parties computers 308, 310, and a chat session is started between the calling and called parties.

Figure 5:
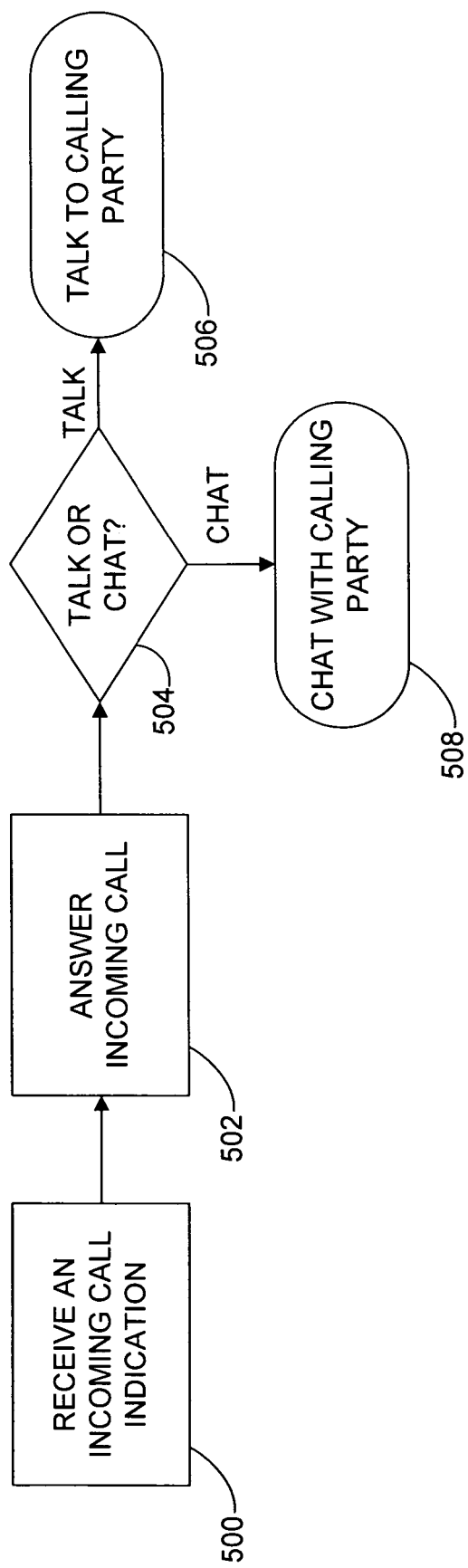
FIG. 5 is a flowchart illustrating a method of using the integrated chat client shown in FIG. 1.

Referring now to FIG. 5, shown is a flowchart illustrating a method for answering a telephone call using the integrated chat client service. According to the first block 500, the called party telephone 306 receives an indication signifying an incoming telephone call. Typically, this indication is a signal for generating a sound such as a ringing telephone, however, it could easily be of another notification type. Then, as illustrated by block 502, the called party answers the telephone 306. The called party is then prompted, in block 504, to choose whether or not he or she would like to chat with the calling party. If the called party does not wish to chat with the calling party, the call is connected, as illustrated by block 506. If the called party does wish to chat, as in block 508, the called party will hang-up the phone 306 and accept an invitation sent to his computer from the application/chat server.

The systems described herein would provide the user with the flexibility to communicate with a calling party without making his/her side of the conversation available to others in the area. For example such communication could be invaluable to an employee who is looking for a new job and would like to keep it secret from his/her supervisor and co-workers. Another situation in which such a system would be useful may occur during the purchase of a new home, when lenders might call the workplace of the buyer and request sensitive information such as salary and/or net worth, which the employee does not want to share with his/her co-workers.

Process and function descriptions and blocks in flow charts can be understood as representing, in some embodiments, modules, segments, or portions of code which include one or more executable instructions for implementing specific logical functions or steps in the process, and alternate implementations are included within the scope of the preferred embodiment of the present invention in which functions may be executed out of order from that shown or discussed, including substantially concurrently or in reverse order, depending on the functionality involved, as would be understood by those reasonably skilled in the art of the present invention. In addition, such functional elements can be implemented as logic embodied in hardware, software, firmware, or a combination thereof, among others. In some embodiments involving software implementations, such software comprises an ordered listing of executable instructions for implementing logical functions and can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a computer-readable medium can be any means that can contain, store, communicate, propagate, or transport the software for use by or in connection with the instruction execution system, apparatus, or device.

It should be emphasized that the above-described embodiments of the present invention are merely possible examples of implementations set forth for a clear understanding of the principles of the invention. Many variations and modifications may be made to the above-described embodiment(s) of the invention without departing substantially from the principles of the invention. All such modifications and variations are intended to be included herein within the scope of this disclosure and the present invention and protected by the following claims.

What is claimed is:

1. A communication system, comprising:
   a first processing system element operable to check a chat server for accessibility of a sending party chat client associated with a sending party; and
   a second processing system element operable to prompt a receiving party to select to talk or chat.

2. The communication system of claim 1, wherein the chat server is operable to send chat invitations to the sending party chat client and a receiving party chat client upon the receiving party selecting to chat with the sending party.

3. The communication system of claim 2, wherein the first processing system element is operable to instruct a voice communication to be established upon the receiving party selecting to talk to the sending party.

4. The communication system of claim 3, wherein the first processing system element is further operable to check whether the receiving party has a chat client registered through a chat server.

5. The communication system of claim 4, wherein the chat server is further operable to search and update a second database, the second database comprising information about which of a plurality chat clients are registered with the chat server.

6. The communication system of claim 5, wherein the second database further comprises information about which of the plurality of chat clients registered with the chat server are present at a computer to chat.

7. The communication system of claim 6, wherein the second database further comprises information about which of the plurality of chat clients registered with the chat server would like to be prompted about availability of an option to chat.

8. A method for connecting communications, comprising the steps of:
   checking for accessibility of a sending party chat client associated with a sending party; and
   prompting a receiving party to choose to either talk or chat if the receiving party chat client is accessible.

9. The method of claim 8, further comprising:
   sending a chat invitation to the receiving and sending parties, inviting initiation of a chat session when the receiving party chooses to chat.

10. The method of claim 9, further comprising:
    establishing a voice communication when the receiving party chooses to talk.

11. The method of claim 8, wherein the method further comprises:
    checking whether the receiving party has a receiving party chat client accessible.

12. The method of claim 8, further comprising:
    updating a first database, the first database comprising information used to connect a plurality of chat clients;
    updating a second database, the second database comprising information about which of a plurality chat clients are registered with the chat server; and
    searching a second database for registration of the sending party chat client.

13. The method of claim 12, wherein the second database further comprises information about which of the plurality of chat clients registered are present at a terminal to chat, and checking for accessibility further comprises:
    searching the second database for presence of the sending party chat client.

14. A computer readable medium having a program for connecting communications, the program performing the steps of:
    checking accessibility of a sending party chat client associated with a sending party; and
    prompting a receiving party to choose to either talk or electronically chat if the receiving party chat client is accessible.

15. The medium of claim 14, wherein the program further performs the steps of:
    sending electronic chat invitations to the receiving party and the sending party if the receiving party chooses to electronically chat; and
    initiating an electronic chat session when the receiving party and the sending party accept the electronic chat invitations.

16. The medium of claim 15, wherein the program performs the step of checking accessibility in response to a voice communication request and the program further performs the step of:
    terminating the voice communication request after the electronic chat session is initiated.

17. The medium of claim 14, wherein the program further performs the step of:
    checking whether the receiving party has a receiving party chat client accessible.

18. The medium of claim 14, wherein the program performs the step of
    checking accessibility in response to a voice communication request and the program further performs the step of:
    establishing a voice communication when the receiving party chooses to talk.

19. The medium of claim 14, wherein accessibility of a sending party computer associated with a sending party depends upon presence of a registration with an electronic chat server.

20. The medium of claim 19, wherein accessibility of the receiving party computer further depends upon a preference of the receiving party toward chat sessions.

* * * * *